(12) United States Patent
Chen (10) Patent No.: US 8,926,203 B1
(45) Date of Patent: Jan. 6, 2015

(54) WRITING INSTRUMENT GRIPPING AID AND WRITING INSTRUMENT HAVING THE SAME

(71) Applicant: Te-So Chen, Taipei (TW)

(72) Inventor: Te-So Chen, Taipei (TW)

( * ) Notice: Subject to any disclaimer, the term of this patent is extended or adjusted under 35 U.S.C. 154(b) by 0 days.

(21) Appl. No.: 13/916,246

(22) Filed: Jun. 12, 2013

(30) Foreign Application Priority Data

Jun. 18, 2012 (TW) ............................. 101211733 U (51) Int. Cl.
*A46B 5/02* (2006.01)
*B43K 23/008* (2006.01)

(52) U.S. Cl.
CPC ..................................... *B43K 23/008* (2013.01)
USPC .................................... 401/6; 16/430; D19/54

(58) Field of Classification Search
CPC .... B43K 23/00; B43K 23/004; B43K 23/008; B43K 23/012; B43K 23/016; B43K 23/02; B25G 1/002; B25G 1/005; B25G 1/10; B25G 1/102; B25G 1/105; A63B 59/0014; A63B 59/0025

USPC ................. 401/6, 88; 16/430; D19/47–49, 55
See application file for complete search history.

(56) References Cited

U.S. PATENT DOCUMENTS

| 2,173,451 | A | * | 9/1939 | Lorber | ............................. 401/6 |
| D396,059 | S | * | 7/1998 | Plantz et al. | ................... D19/55 |
| 6,203,225 | B1 | * | 3/2001 | Baudino et al. | ................... 401/6 |
| 2005/0155185 | A1 | * | 7/2005 | Shmueli et al. | ................. 16/430 |

* cited by examiner

*Primary Examiner* — David Walczak
(74) *Attorney, Agent, or Firm* — Muncy, Geissler, Olds & Lowe, P.C.

(57) ABSTRACT

A writing instrument gripping aid comprising a hollow prism body consisting of three faces, wherein a cross-section perpendicular to a longitudinal direction of the hollow prism body defines a curvilinear isosceles triangle with both base angles greater than 60 degrees and is a writing instrument using the writing instrument gripping aid.

10 Claims, 8 Drawing Sheets

WRITING INSTRUMENT GRIPPING AID AND WRITING INSTRUMENT HAVING THE SAME

CROSS-REFERENCE TO RELATED APPLICATIONS

This Application claims priority of Taiwan Patent Application No, 101211733, filed on Jun. 18, 2012, the entirety of which is incorporated by reference herein.

FIELD OF THE INVENTION

This invention relates to a writing instrument gripping aid and particularly to a writing instrument gripping aid capable of correcting the pen or pencil gripping posture of a user.

BACKGROUND OF THE INVENTION

Wrong writing posture is one of the major causes of myopia and scoliosis of school-aged children, and wrong writing posture often results from wrong pen or pencil gripping posture.

Figure 1A:
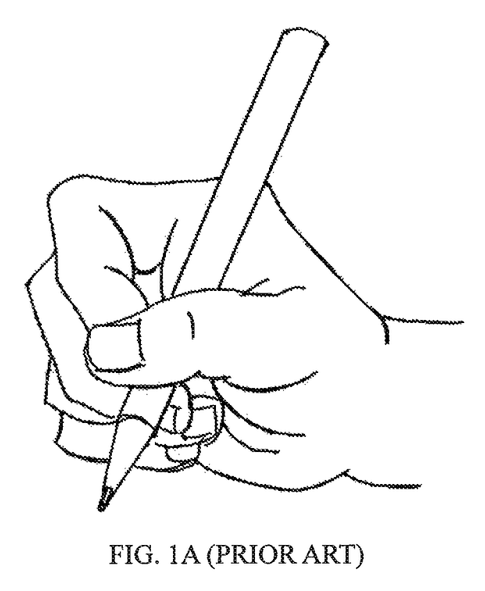
FIGS. 1A and 1B illustrate two common wrong pen or pencil gripping postures.
Figure 1B:
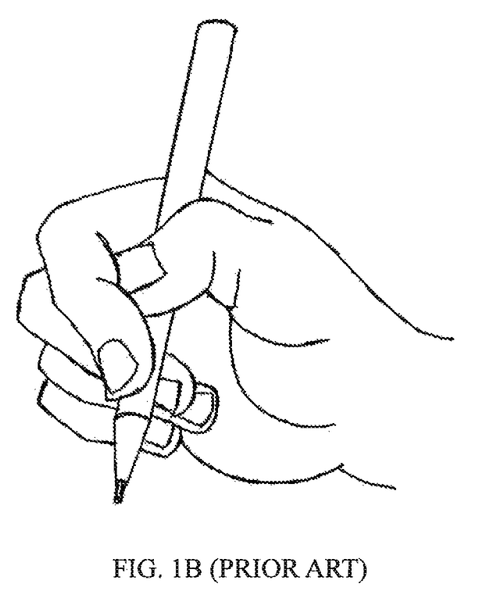

Generally, common wrong pen or pencil gripping posture includes the thumb overlapping the index finger and the index finger overlapping the thumb, respectively illustrated in FIGS. 1A and 1B. Adopting such a wrong pen or pencil gripping posture to write will, in a long term, result in health problems such as myopia, strabismus, twisted hand and scoliosis.

Various commercially available pen or pencil grippers have been proposed in order to correct the writing posture of a user. However, these grippers are not satisfactory due to the following drawbacks: their complicated shapes lead to production difficulty and high costs; the strange shapes fail to excite the interest of users, particularly school-aged children; the concave finger positioning design is only suitable for static pencil or pen gripping but not suitable for dynamic writing; they are only applicable to writing instruments of a certain diameter or specification; and the process of assembling these grippers with pens or pencils and disassembling them tend to be troublesome.

SUMMARY OF THE INVENTION

It is an object of this invention to provide a writing instrument gripping aid comprising a hollow prism body consisting of three faces, wherein a cross-section perpendicular to a longitudinal direction of the hollow prism body defines a curvilinear isosceles triangle with both base angles greater than 60 degrees.

It is another object of this invention to provide a writing instrument using the aforesaid writing instrument gripping aid, comprising a writing instrument body and a writing instrument gripping aid disposed thereon.

The writing instrument gripping aid of this invention can be configured to correct the pen or pencil gripping posture and writing posture of a user. It is applicable to most writing instruments and has the advantages of a simple and compact structure, easy installation, broad applicability and low costs.

The foregoing general description and the following detailed description are exemplary and explanatory only and are not restrictive of the invention as defined in the claims.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

DETAILED DESCRIPTION OF THE INVENTION

Embodiments are illustrated in the accompanying figures to improve understanding of concepts as presented herein. Skilled artisans appreciate that elements in the figures are illustrated for simplicity and clarity and have not necessarily been drawn to scale. For example, the dimensions of some of the elements in the figures may be exaggerated relative to others to facilitate understanding of the embodiments.

Various aspects and embodiments have been described above and are merely exemplary and not limiting. After reading this specification, skilled artisans appreciate that other aspects and embodiments are possible without departing from the scope of the invention. Other features and benefits of any one or more of the embodiments will be apparent from the following detailed description and the claims.

Figure 2:
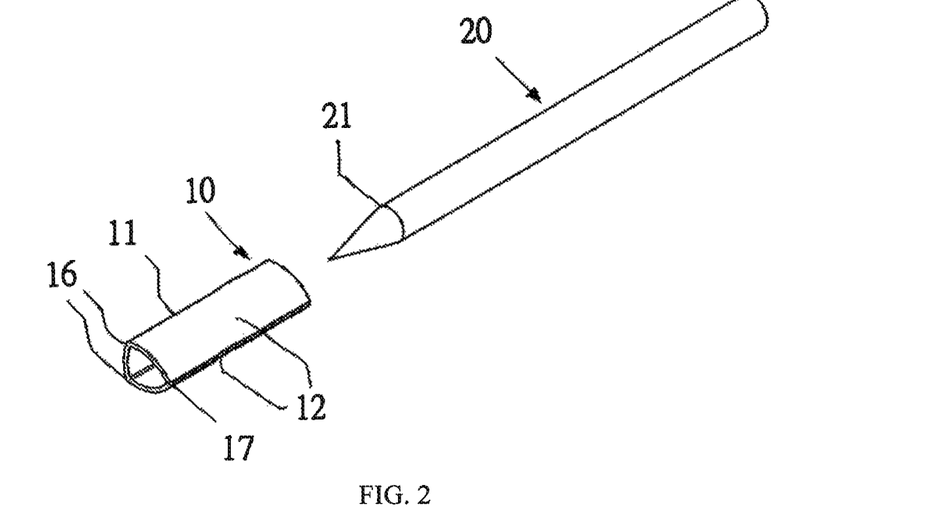
FIG. 2 illustrates a writing instrument gripping aid according to one embodiment of this invention before being combined with a pencil.

FIG. 2 illustrates a writing instrument gripping aid 10 according to one embodiment of this invention, which has a hollow prism body consisting of three faces. In this embodiment, the writing instrument gripping aid 10 has a narrow curved plane 11 and two symmetrical wide curved planes 12, such that the writing instrument gripping aid 10 takes the form of a curvilinear isosceles triangle when observed from the longitudinal direction of the hollow prism body.

In this invention, angles formed between the narrow curved plane 11 and each of the wide curved planes 12 are greater than 60 degrees, so the width of each wide curved planes 12 is greater than that of the narrow curved plane 11. In other words, the angle formed between the two wide curved planes 12 is less than 60 degrees. Compared with an equilateral triangle cross-section, the isosceles triangle design adopted by this invention is in better compliance to ergonomics and enables the thumb, the index finger and the middle finger to adopt a correct posture to grip the writing instrument.

In this invention, the three faces constituting the prism body are preferably convex curved faces, and the curvature of the narrow curved plane 11 may be the same as or different from that of the wide curved planes 12. This structural design allows fingers to grip or hold the writing instrument in a flexible way and provides mobility and freedom of adjustment to the fingers, such that a user is not limited by a concave curved face for example when gripping a pen or pencil. Accordingly, when a user uses the writing instrument gripping aid 10 of this invention to undertake writing, he or she may be provided with a larger finger movement space to perform writing of bigger characters or letters. In addition, the design of the convex curved faces broader than the body of a writing instrument provides a larger area on which fingers can be rested, such that the thumb and the index finger may exert pushing and pressing force more easily, and the pen or pencil holding pressure on the distal phalanx of the middle finger may be better distributed.

In one embodiment, two corners 16 are formed between the narrow curved plane 11 and each wide curved plane 12. Preferably, the outer surface of each corner 16 has a predetermined acuteness or roundness, such that when a user holds the writing instrument gripping aid 10 with a wrong posture, such as with his or her index finger overlapped by the thumb or with the thumb overlapped by the index finger, the wrongly positioned fingers will feel uncomfortable due to resting and pressing on the corners 16, forcing the user to adjust the posture to the correct gripping posture. In one embodiment, the angle of the outer surface of each corner 16 may be but not limited to for example about 90 degrees, about 85 degrees, about 80 degrees or about 75 degrees.

Figure 8A:
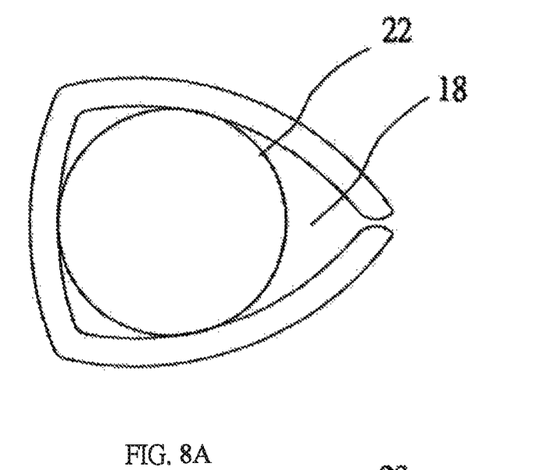
FIGS. 8A to 8C are the cross-sectional views of the writing instrument gripping aids according to different embodiments of this invention combined with different writing instruments.
Figure 8B:
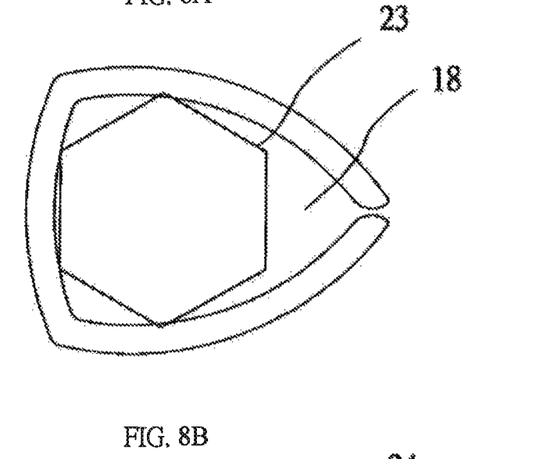
Figure 8C:
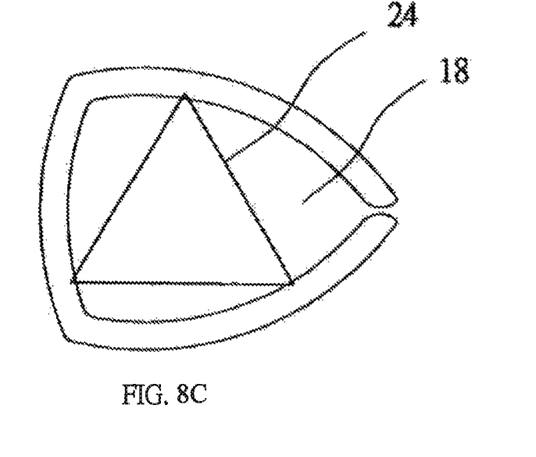

In this invention, the vertex angle formed between the two wide curved planes 12 is less than 60 degrees, and the vertex angle is preferably a discrete structure. For example, in one embodiment, the two wide curved planes 12 are spaced or separated by a slit 17, such that the writing instrument gripping aid 10 may fit different writing instruments of various sizes. As shown in FIGS. 8A to 8C, a passage 18 defined in the writing instrument gripping aid 10 may accommodate or receive a writing instrument with any cross-section, such as a round pencil 22, a hexagonal pencil 23, a triangular pencil 24, or any other writing instrument with a different polyhedral or irregular cross-section. In one preferred embodiment, when a writing instrument is passed through the passage 18, three sides of the cross-sectional curvilinear isosceles triangle are all in contact with the writing instrument in such a way that the two legs of the curvilinear isosceles triangle are forced to open by the writing instrument and become spaced from each other.

In order to fit most writing instruments, the circle inscribed with the cross-sectional curvilinear isosceles triangle of the passage or channel preferably has a diameter slightly less than that of a writing instrument. For example, the diameter of the circle may range from 6 to 10 mm, such as about 7 mm or about 8 mm, but not limited thereto.

Figure 3:
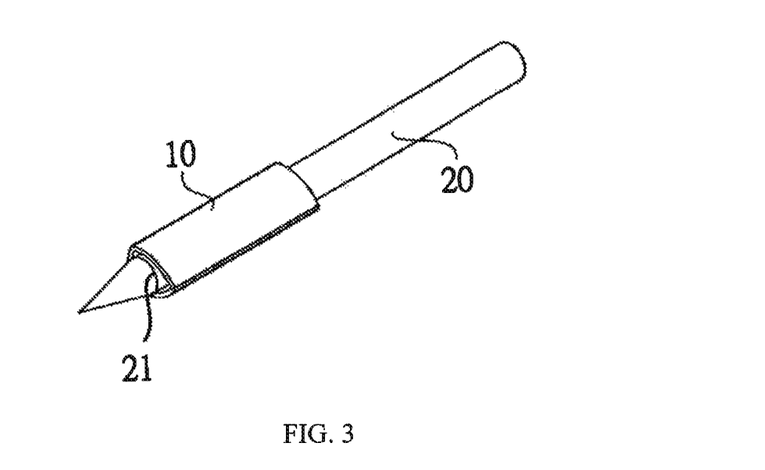
FIG. 3 illustrates a writing instrument gripping aid according to one embodiment of this invention after being combined with a pencil.
Figure 4:
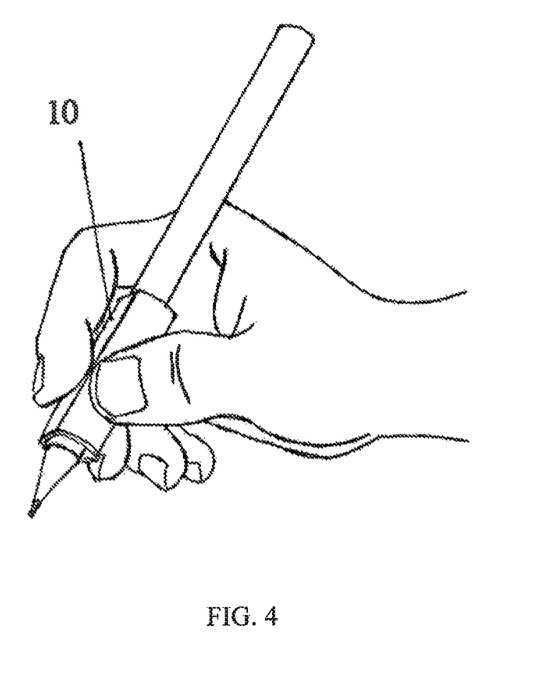
FIG. 4 illustrates the posture of a user gripping a writing instrument gripping aid according to one embodiment of this invention and a writing instrument.

When in use, the writing instrument gripping aid 10 may be sleeved from the front or rear end of a writing instrument. As shown in FIG. 2, the writing instrument gripping aid 10 may be sleeved from the pointed end of a pencil 20, forming an assembled structure as FIG. 3, wherein the front terminal end of the writing instrument gripping aid 10 is slightly above the sharpened edge 21 of the pencil 20. Therefore, when a user writes with the pencil 20, his or her fingers may be naturally and respectively rested on different faces of the writing instrument gripping aid 10 to hold the pencil 20, forming a comfortable and correct pencil gripping posture, as illustrated in FIG. 4. With the structural design of the writing instrument gripping aid 10, the user can undertake writing with a correct gripping posture, in which the elongated body of the pencil is leaned on the proximal phalanx of the index finger, the thumb and the index finger define a circle therebetween, the palm is hollow and the index finger is slightly below the thumb. In addition, by setting the front terminal end of the writing instrument gripping aid 10 slightly above the sharpened edge 21, user's fingers are prevented from getting too close to the pen or pencil tip when writing.

Figure 5A:
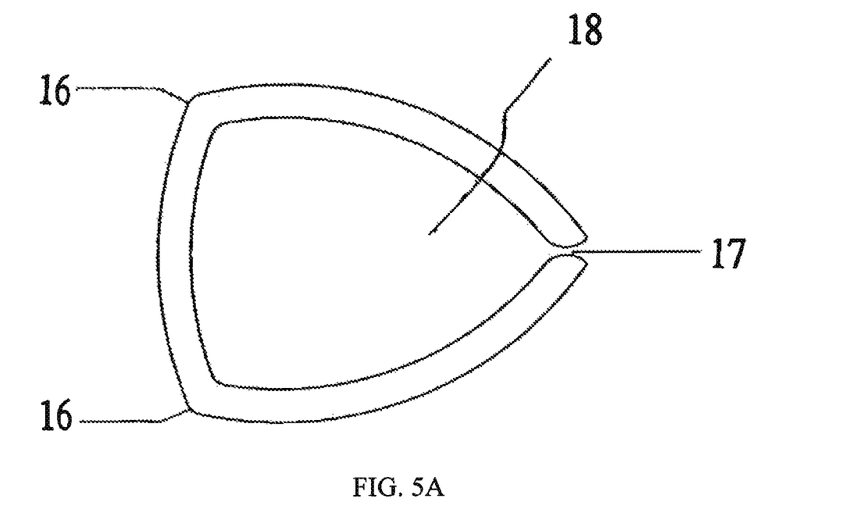
FIGS. 5A and 5B are the cross-sectional views of the writing instrument gripping aids according to two different embodiments of this invention.

FIG. 5A is a cross-sectional view of a writing instrument gripping aid according to one embodiment of this invention, wherein the cross-section is taken from a direction perpendicular to the longitudinal direction of the prism body. In this embodiment, the three faces of the writing instrument gripping aid define therebetween a passage 18 to be inserted by and hold a writing instrument. In addition, with the design of the slit 17, the writing instrument gripping aid may be conveniently assembled with any writing instrument and prevented from falling off easily. In order to achieve the purposes of easy assembly with and disassembly from a writing instrument as well as prevention of skid or falling off of the writing instrument gripping aid during use, the material used to make the writing instrument gripping aid has a proper flexibility or elasticity and strength, such that when the writing instrument gripping aid is combined with a writing instrument, the opening between the two wide curved planes is slightly expanded by the writing instrument to increase the size of the passage 18 for accommodating a writing instrument with a larger cross-sectional diameter, and the two wide curved planes may be clamped on the writing instrument after assembly by the elastic resilience. In other words, the slit 17 is an expandable slit for providing a better applicability than conventional grippers with a fixed passage size.

Figure 5B:
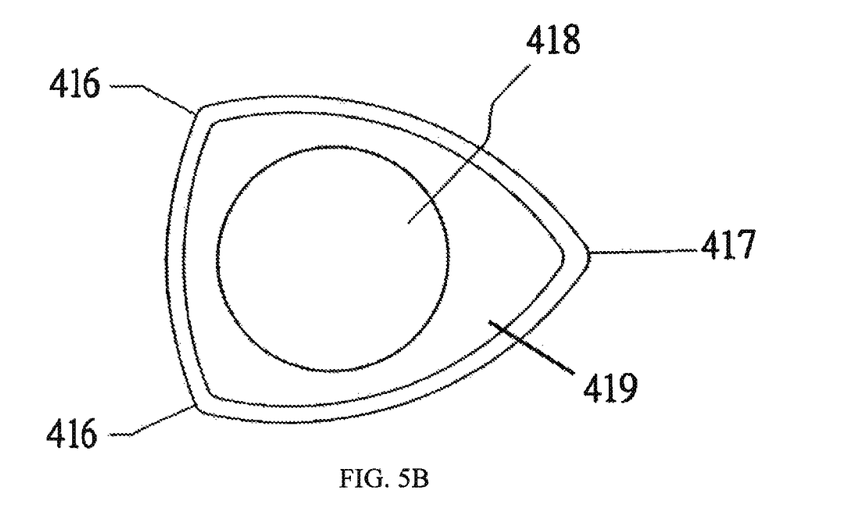

FIG. 5B is a cross-sectional view of a writing instrument gripping aid according to another embodiment of this invention. Unlike the embodiment in FIG. 5A, this embodiment does not contain a slit, so the cross-section is a continuous, non-discrete curvilinear isosceles triangle. In this embodiment, each two of the three curved planes of the writing instrument gripping aid respectively define two corners 416 and a vertex angle 417, and filler material 419 is contained between the passage 418 and the writing instrument gripping aid. In short, the filler material 419 is used to define the passage 418.

This embodiment is particularly suitable for the fabrication of a writing instrument having the writing instrument gripping aid, during which the body of the writing instrument, which occupies the space of the passage 418, is formed first, then the filler material 419 is formed on the body of the writing instrument already formed, and finally the writing instrument gripping aid is formed on the filler material 419, wherein the writing instrument gripping aid may be a film or layer structure having the shape mentioned above. Undoubtedly, the order of the steps performed during production may be changed if necessary, or the steps can be performed concurrently. For example, co-injection molding may be used to form the filler material 419 and the writing instrument gripping aid covered thereon at the same time. Optionally, the writing instrument gripping aid may be formed on the writing instrument without using the filler material 419, and the formation process is not particularly limited, depending on the convenience of the process. Moreover, in one embodiment, the filler material 419 is different from the material of the outer writing instrument gripping aid, and the material of the writing instrument gripping aid is preferably softer than the filler material 419 so as to increase the gripping comfortableness.

Figure 11:
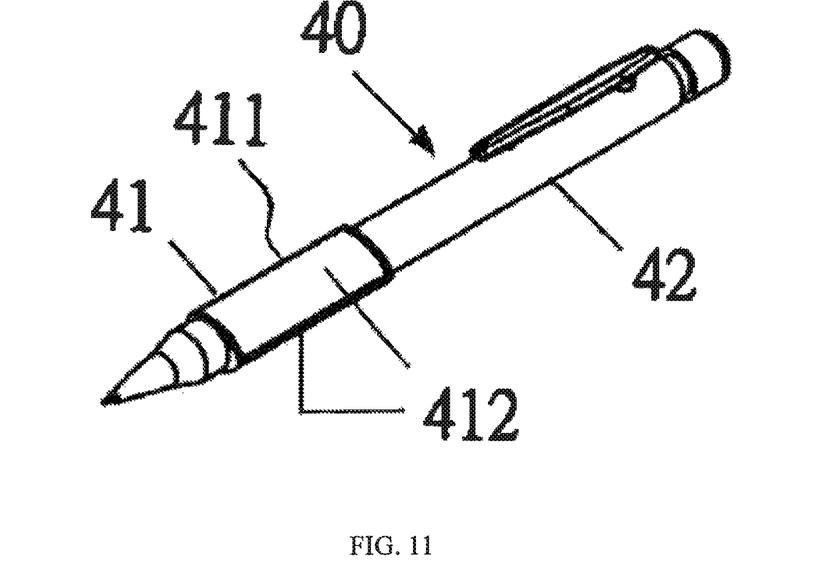
FIG. 11 illustrates a writing instrument according to one embodiment of this invention incorporating a writing instrument gripping aid.

FIG. 11 illustrates a writing instrument according to one embodiment of this invention, in which the writing instrument 40 has a grip portion 42, such as a tubular body, and a writing instrument gripping aid 41 disposed on the grip portion 42, the writing instrument gripping aid 41 having a narrow curved plane 411 and two wide curved planes 412. In this embodiment, the writing instrument 40 is a mechanical pencil; however, it may also be a ballpoint pen, a fountain pen, or any other writing instrument. In addition, as described above, the writing instrument gripping aid 41 may be integrally formed with the writing instrument 40 during fabrication, or it may be combined with the grip portion 42 by assembly.

In a preferred embodiment, the writing instrument gripping aid may comprise a finger positioning structure to assist a user to hold the writing instrument gripping aid in a correct manner. As shown in FIGS. 6 and 7A through 7D, the narrow curved plane of the hollow prism body may act as an index finger positioning face, and the wide curved planes may respectively act as a thumb positioning face and a middle finger positioning face, wherein at least one face contains a finger positioning structure, such as an index finger positioning structure 13, a thumb positioning structure 14, and/or a middle finger positioning structure 15. Furthermore, the finger positioning structure may also be a bump 19, as illustrated in the writing instrument gripping aid of FIG. 7D, which is a protrusion formed integrally and together with the writing instrument gripping aid for positioning such as the index finger.

Figure 6:
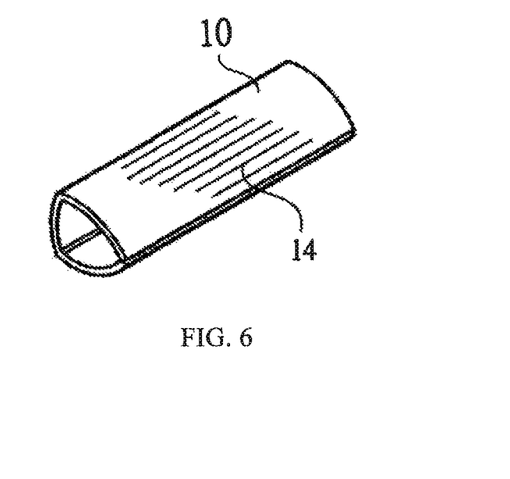
FIG. 6 illustrates a writing instrument gripping aid according to another embodiment of this invention.
Figure 7A:
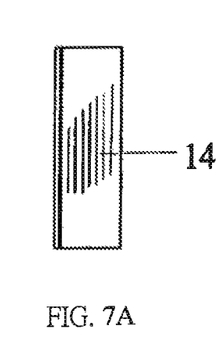
FIGS. 7A to 7D illustrate a finger positioning structure of the writing instrument gripping aids according to different embodiments of this invention.
Figure 7B:
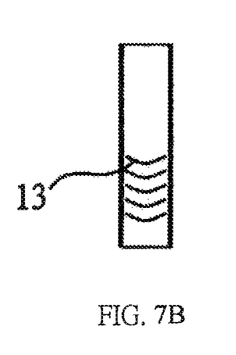
Figure 7C:
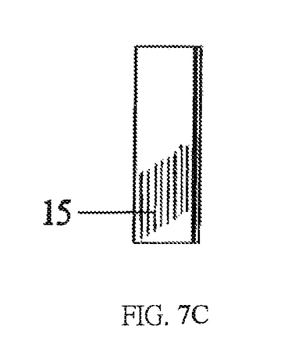
Figure 7D:
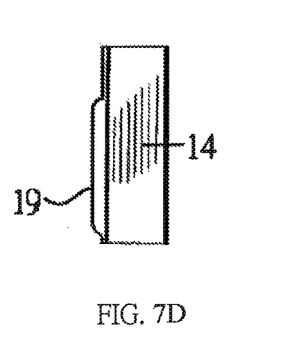

The finger positioning structure may be a concave and/or convex structure, but not limited thereto. As illustrated in FIG. 6, the thumb positioning structure 14 may be formed on the thumb positioning face as a plurality of linear grooves. Because the thumb positioning structure 14 is not a concave groove with a significant depth, a user will only feel several pattern-like structures on the thumb when using the writing instrument gripping aid 10 to write, and free writing without difficulty can be undertaken easily. Also, according to the ergonomic design, a different type of positioning structure may be used, such as a curvilinear groove, a bump or a combination thereof.

In the above-identified embodiments, the location of the finger positioning structure formed on each face is not specifically limited, and it may be close to the end or near the center. For example, the finger positioning structure on the index finger positioning face may be slightly lower than that of the thumb positioning face to ensure a correct writing posture with the thumb slightly above the index finger.

Figure 9:
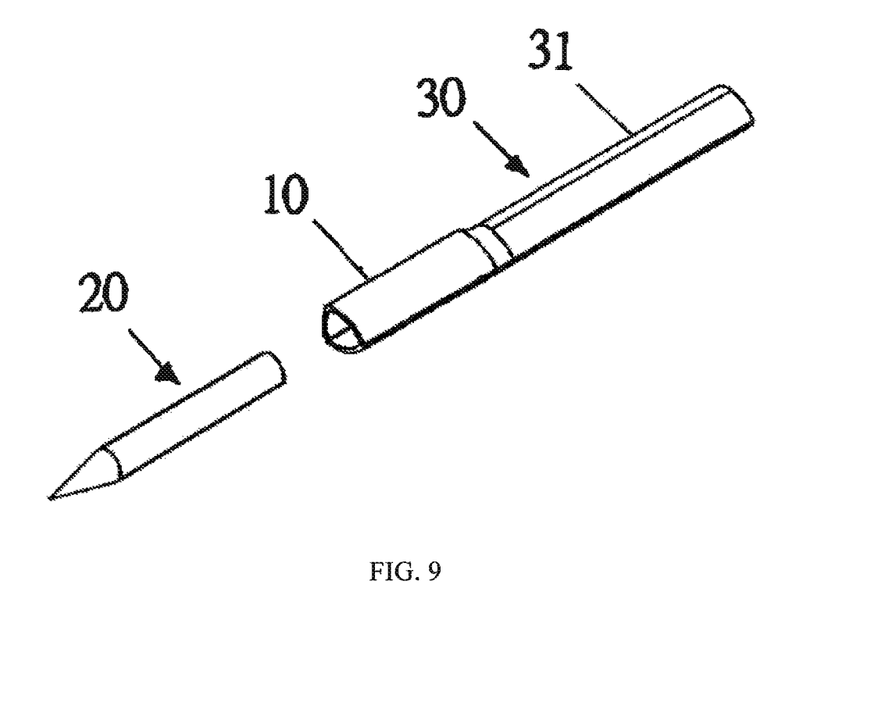
FIG. 9 illustrates a pencil extender containing a writing instrument gripping aid according to one embodiment of this invention before being combined with a pencil.
Figure 10:
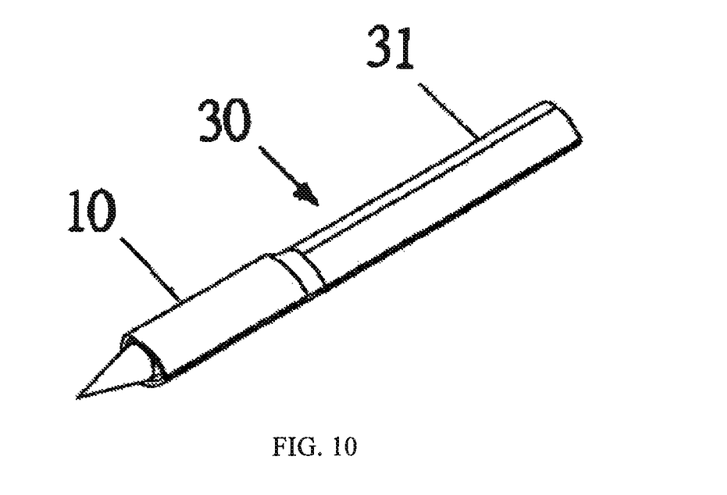
FIG. 10 illustrates a pencil extender containing a writing instrument gripping aid according to one embodiment of this invention after being combined with a pencil.

In other embodiments, the writing instrument gripping aid of this invention may also provide other applications. For example, the writing instrument gripping aid may be sleeved on the tip of a writing instrument to form a protective cover which prevents the tip from being damaged or scribing on the container receiving the writing instrument, such as a pencil box or bag. In addition, the writing instrument gripping aid may be integrated, incorporated, assembled or formed with other structures or components to achieve other functions. In one embodiment, the writing instrument gripping aid may constitute a pencil extender. As illustrated by FIGS. 9 and 10, the writing instrument gripping aid 10 may be integrated with an extension member 31 to increase the overall length and form a pencil extender 30. As such, when a pencil has a length too short to be gripped for writing, the pencil extender 30 may be sleeved from the rear end of the pencil, such that the extension member 31 may be used as the body of the pencil to facilitate holding or gripping. Moreover, in another embodiment, the length of the writing instrument gripping aid 10 may be increased to an overall length of about 10 to 20 cm, so that the functionality of a pencil extender can also be realized without using the extension member 31.

In this invention, different components or structures may be individually formed and then assembled together or preferably formed integrally or as one piece. For example, the writing instrument gripping aid or the writing instrument with a writing instrument gripping aid may be formed with an appropriate mold by extrusion molding, injection molding or other means contemplated by those skilled in the art. Moreover, the writing instrument gripping aid according to the present invention may be made of any material suitable for gripping, such as, but not limited to, various plastic, preferably polypropylene.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A writing instrument gripping aid, comprising a hollow prism body consisting of a thumb positioning face, an index finger positioning face and a middle finger positioning face, which respectively comprise a thumb positioning structure, an index finger positioning structure and a middle finger positioning structure, wherein a cross-section perpendicular to a longitudinal direction of the hollow prism body defines a curvilinear isosceles triangle with both base angles greater than 60 degrees and wherein the index finger positioning structure is lower than the thumb positioning structure.

2. The writing instrument gripping aid of claim 1, wherein the hollow prism body defines an expandable slit.

3. The writing instrument gripping aid of claim 1, wherein a vertex angle of the curvilinear isosceles triangle forms an opening.

4. The writing instrument gripping aid of claim 1, wherein at least one finger positioning structure comprises a plurality of linear grooves.

5. The writing instrument gripping aid of claim 1, wherein at least one finger positioning structure comprises a plurality of curvilinear grooves.

6. The writing instrument gripping aid of claim 1, wherein at least one finger positioning structure comprises a bump.

7. The writing instrument gripping aid of claim 1, wherein the index finger positioning face has a width less than that of the thumb positioning face and the middle finger positioning face.

8. The writing instrument gripping aid of claim 1, wherein the hollow prism body is adapted to be sleeved on a writing instrument, such that three sides of the cross-sectional curvilinear isosceles triangle are in contact with the writing instrument in such a way that two legs of the curvilinear isosceles triangle are spaced from each other.

9. A writing instrument, comprising:
 a writing instrument body comprising a grip portion; and
 the writing instrument gripping aid of claim 1 mounted on the grip portion.

10. The writing instrument of claim 9, wherein one of the finger positioning structures is selected from the group consisting of a linear groove, a curvilinear groove, a bump or a combination thereof.

* * * * *